(12) United States Patent
Cogley

(10) Patent No.: US 10,708,549 B1
(45) Date of Patent: Jul. 7, 2020

(54) ADVERTISEMENT/SURVEILLANCE SYSTEM

(71) Applicant: Thomas Paul Cogley, Pinellas Park, FL (US)

(72) Inventor: Thomas Paul Cogley, Pinellas Park, FL (US)

( * ) Notice: Subject to any disclaimer, the term of this patent is extended or adjusted under 35 U.S.C. 154(b) by 0 days.

(21) Appl. No.: 16/025,732

(22) Filed: Jul. 2, 2018

Related U.S. Application Data

(60) Provisional application No. 62/528,484, filed on Jul. 4, 2017.

(51) Int. Cl.
*H04N 7/18* (2006.01)
*G06Q 30/02* (2012.01)

(52) U.S. Cl.
CPC ......... *H04N 7/183* (2013.01); *G06Q 30/0261* (2013.01)

(58) Field of Classification Search
CPC .......................... H04N 7/183; G06Q 30/0261
USPC ........................................................ 348/151
See application file for complete search history.

(56) References Cited

U.S. PATENT DOCUMENTS

| 2009/0027498 A1* | 1/2009 | Owen | H04N 7/183 |
| | | | 348/151 |
| 2014/0293045 A1* | 10/2014 | Horovitz | A63F 3/00643 |
| | | | 348/135 |
| 2015/0206405 A1* | 7/2015 | Sanford, Jr. | G08B 15/001 |
| | | | 348/151 |
| 2017/0278366 A1* | 9/2017 | Burke | G06K 9/00771 |

* cited by examiner

*Primary Examiner* — Nguyen T Truong

(57) ABSTRACT

An object is positionable at a service provider's site to be surveilled. The object has an appearance to advertise services/products to be provided at the site to a service receiver. A camera is unobtrusively formed in the object to monitor the site and to create images. The object has operative components located within the object. The operative components include a source of electrical potential for the camera, a switch to activate and inactivate the camera, and a digital device to provide a record of the images created by the camera.

2 Claims, 2 Drawing Sheets

FIG. 2
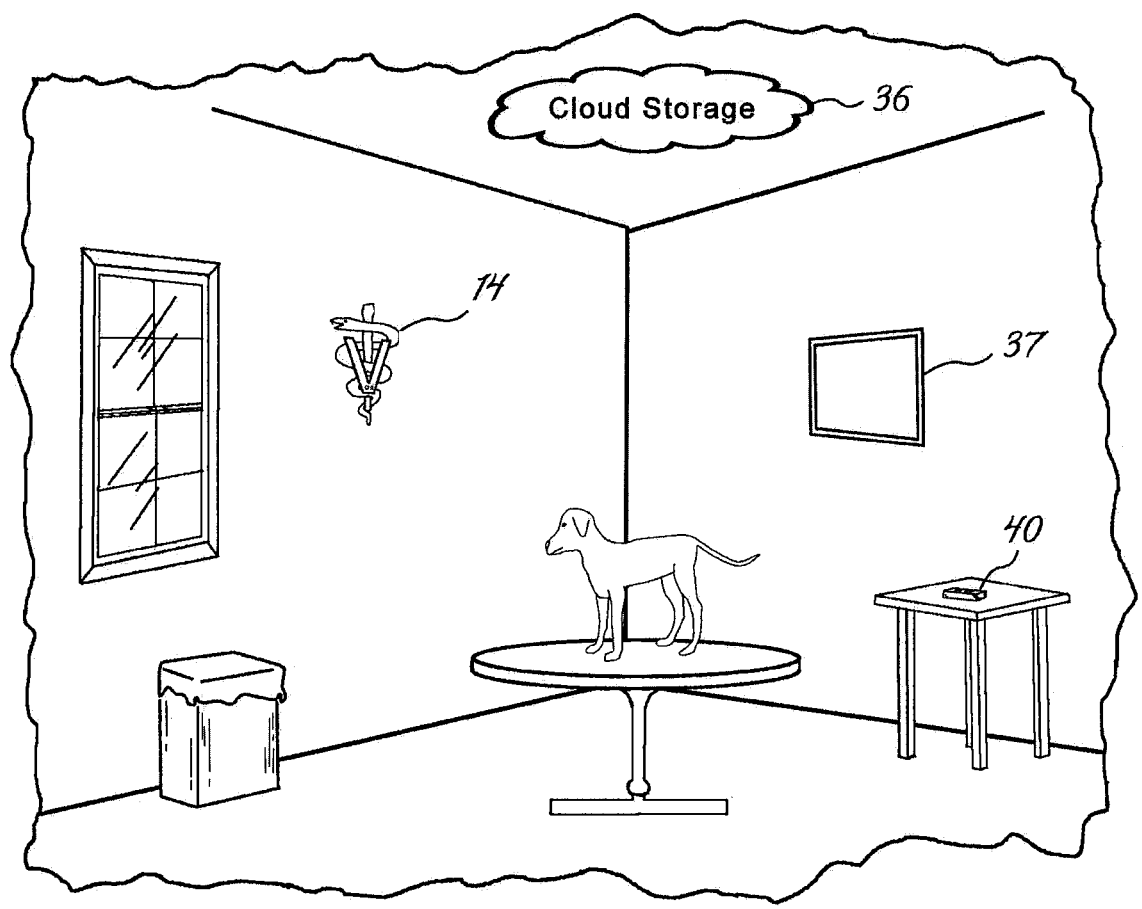
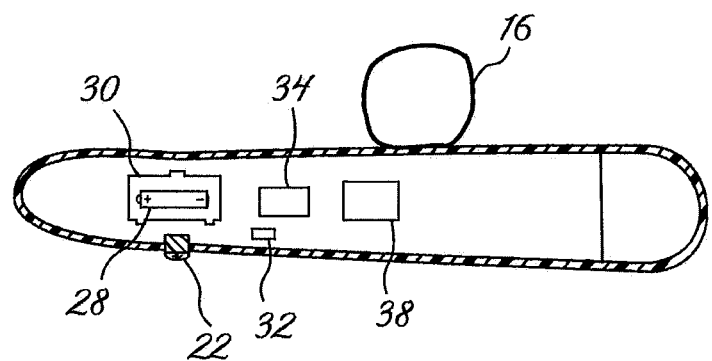
FIG. 3

ADVERTISEMENT/SURVEILLANCE SYSTEM

BACKGROUND OF THE INVENTION

Field of the Invention

The present invention relates to an advertisement/surveillance system and more particularly pertains to surveilling a service provider's site and for advertising services and products to be provided at the site to a service receiver. The surveilling and the advertising are done in a safe, discreet, eye-appealing, convenient, and economical manner.

Further the present invention relates to a symbolic object such as a Caduceus or a Rod of Asclepius, typically depicting a wand or staff with at least one serpent twined around it. The object depicted may further have the shape of the Scales of Justice or a like object.

Description of the Prior Art

The use of advertisement systems and surveillance systems of known designs and configurations is known in the prior art. More specifically, advertisement systems and surveillance systems of known designs and configurations previously devised and utilized for the purpose of advertising and surveilling are known to consist basically of familiar, expected, and obvious structural configurations, notwithstanding the myriad of designs encompassed by the crowded prior art which has been developed for the fulfillment of countless objectives and requirements.

While known devices fulfill their respective, particular objectives and requirements, they do not describe an advertisement/surveillance system that allows surveilling a service provider's site and for advertising services and products to be provided at the site to a service receiver. The surveilling and the advertising are done in a safe, discreet, eye-appealing, convenient, and economical manner.

In this respect, the advertisement/surveillance system according to the present invention substantially departs from the conventional concepts and designs of the prior art, and in doing so provides an apparatus primarily developed for the purpose of surveilling a service provider's site and for advertising services and products to be provided at the site to a service receiver. The surveilling and the advertising are done in a safe, discreet, eye-appealing, convenient, and economical manner.

Therefore, it can be appreciated that there exists a continuing need for a new and improved advertisement/surveillance system which can be used for surveilling a service provider's site and for advertising services and products to be provided at the site to a service receiver. The surveilling and the advertising are done in a safe, discreet, eye-appealing, convenient, and economical manner. In this regard, the present invention substantially fulfills this need.

SUMMARY OF THE INVENTION

In view of the disadvantages inherent in the known types of advertisement systems and surveillance systems of known designs and configurations now present in the prior art, the present invention provides an improved advertisement/surveillance system. As such, the general purpose of the present invention, which will be described subsequently in greater detail, is to provide a new and improved advertisement/surveillance system and method which has all the advantages of the prior art and none of the disadvantages.

To attain this, from a broad perspective, first provided is an object positionable at a service provider's site to be surveilled. The object has an appearance to advertise services/products to be provided at the site to a service receiver. A camera is unobtrusively formed in the object to monitor the site and to create images. The object has operative components located within the object. The operative components include a source of electrical potential for the camera, a switch to activate and inactivate the camera, and a digital device to provide a record of the images created by the camera.

There has thus been outlined, rather broadly, the more important features of the invention in order that the detailed description thereof that follows may be better understood and in order that the present contribution to the art may be appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the invention be regarded as including such equivalent constructions insofar as they do not depart from the spirit and scope of the present invention.

It is therefore an object of the present invention to provide a new and improved advertisement/surveillance system which has all the advantages of the prior advertisement systems and surveillance systems of known designs and configurations and none of the disadvantages.

It is another object of the present invention to provide a new and improved advertisement/surveillance system which may be easily and efficiently manufactured and marketed.

It is a further object of the present invention to provide a new and improved advertisement/surveillance system which is of durable and reliable constructions.

An even further object of the present invention is to provide a new and improved advertisement/surveillance system which is susceptible of a low cost of manufacture with regard to both materials and labor, and which accordingly is then susceptible of low prices of sale to the consuming public, thereby making such advertisement/surveillance system economically available.

Lastly, it is an object of the present invention to provide an advertisement/surveillance system for surveilling a service provider's site and for advertising services and products to be provided at the site to a service receiver where the surveilling and the advertising are done in a safe, discreet, eye-appealing, convenient, and economical manner.

These together with other objects of the invention, along with the various features of novelty which characterize the invention, are pointed out with particularity in the claims annexed to and forming a part of this disclosure.

For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWING

The invention will be better understood and objects other than those set forth above will become apparent when consideration is given to the following detailed description thereof. Such description makes reference to the annexed drawing wherein:

FIG. 2 is a perspective illustration of the system.

FIG. 3 is a cross sectional view taken along line 3-3 of FIG. 1.

DESCRIPTION OF THE PREFERRED EMBODIMENT

Figure 1:
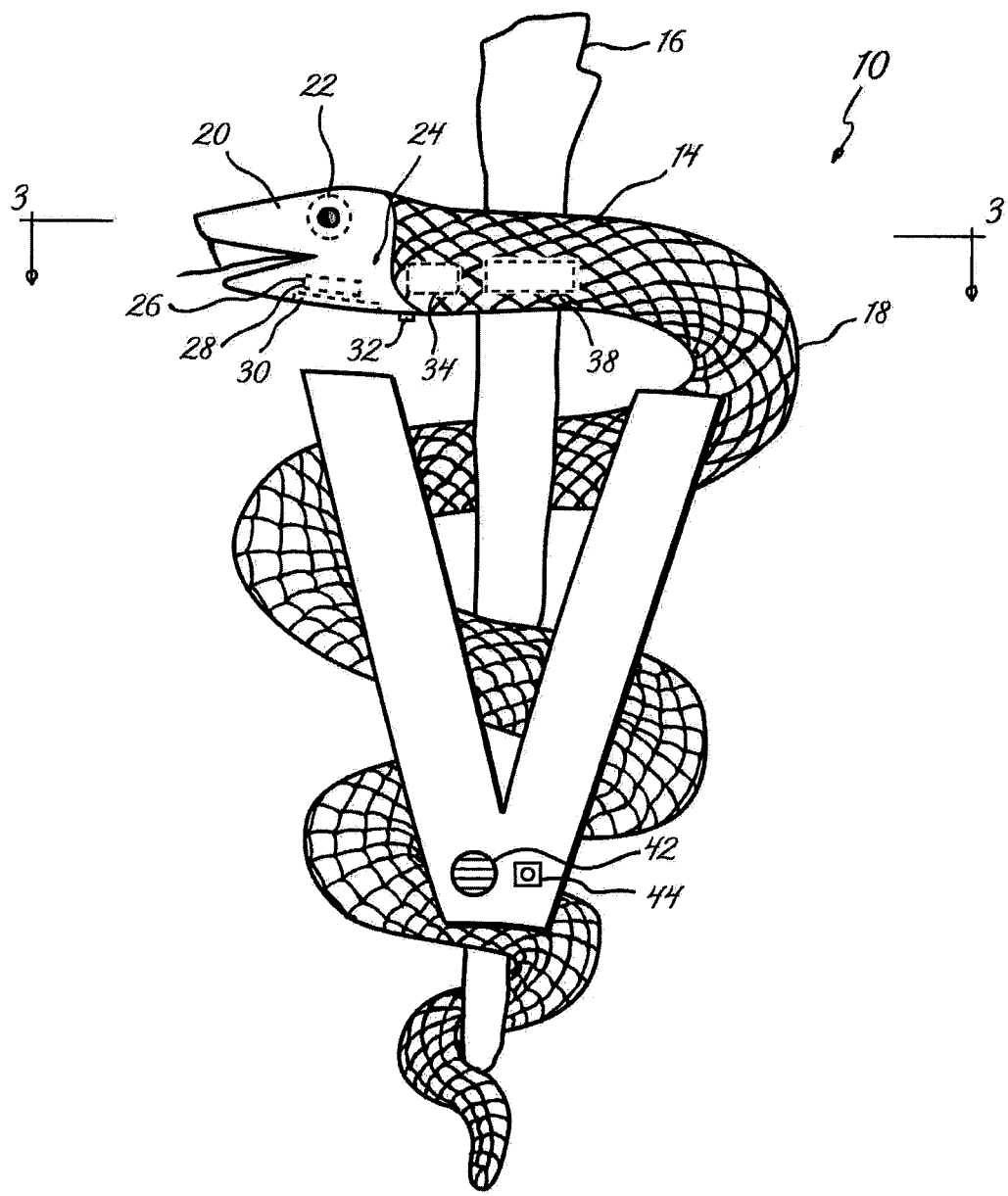
FIG. 1 is a front elevational view of an advertisement/surveillance system constructed in accordance with the principles of the present invention.

With reference now to the drawings, and in particular to FIG. 1 thereof, the preferred embodiment of the new and improved advertisement/surveillance system embodying the principles and concepts of the present invention and generally designated by the reference numeral 10 will be described.

The present invention, the advertisement/surveillance system 10 is comprised of a plurality of components. Such components are individually configured and correlated with respect to each other so as to attain the desired objective. In their broadest context such include an object, a camera, and operative components.

The advertisement/surveillance system 10 is for surveilling a service provider's site and for advertising services and products to be provided at the site to a service receiver. The surveilling and the advertising are done in a safe, discreet, eye-appealing, convenient, and economical manner. In the preferred embodiment, first provided is a caduceus 14 formed of a staff 16 and a serpent 18. The caduceus is positioned at the service provider's site. The service provider's site shown in FIG. 2 is a veterinarian's office. It should be understood that the service provider's site can be any type of service provider's site such as a doctor's office for humans, an attorney's office, or the like. The serpent has an eye region 20. The caduceus has an appearance to advertise veterinarian services and products to be provided at the site to a service receiver.

Next provided is a camera 22. The camera is unobtrusively formed in the eye region of the serpent to monitor the site and to create images.

Lastly, operative components 24 are provided. The operative components are located within the caduceus. The operative components include a source of electrical potential 26 for the camera. In the preferred embodiment, the source of electrical potential is a battery. A battery compartment 28 with a door 30 is provided in the caduceus to provide access for replacing the battery. The source of electrical potential may also be from AC power or from solar power. The operative components also include a switch 32 adjacent to the camera to activate and inactivate the camera. The operative components also include a digital device 34 to provide a record of the images created by the camera which can be uploaded to a cloud storage 36. The operative components further include a computer system with a monitor 37 for viewing images created by the camera in both real time and subsequently. Optionally, the digital device includes a transceiver 38 for controlling the system from a distance using a remote control 40. The digital device may further include a microphone/speaker assembly including a microphone/speaker 42 and a button 44 adapted to be depressed for recording a message and for playback of the message.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An advertisement/surveillance system (10) for surveilling a veterinarian's office and for advertising services to be provided at the veterinarian's office to an animal patient, the system comprising, in combination:

the veterinarian's office to be surveilled having at least one vertical wall;

a caduceus (14) positioned on the at least one vertical wall, the caduceus formed of a staff (16) and a serpent (18), the serpent having an eye (20), the caduceus having an appearance to advertise veterinarian services to be provided at the veterinarian's office;

a camera (22) unobtrusively formed behind the eye of the serpent to monitor the veterinarian's office and to create images;

operative components (24) located within the caduceus, the operative components including a battery (26) within a battery compartment (28) with a door (30) in the caduceus to provide access for replacing the battery;

the operative components also including a switch (32) adjacent to the camera to activate and inactivate the camera; and the operative components also including a digital device (34) to provide a record of the images created by the camera which can be uploaded to a cloud storage (36), a computer system with a monitor (37) for viewing images created by the camera in both real time and subsequently, the digital device including a transceiver (38) for controlling the system from a distance using a remote control (40), the digital device including a microphone/speaker assembly including a microphone/speaker (42) and a button (44) adapted to be depressed for recording a message and for playback of the message.

2. An advertisement/surveillance system (10) for surveilling the office of a medical practitioner and for advertising services to be provided at the office to a patient, the system comprising, in combination:

the office to be surveilled having at least one vertical wall;

an emblem (14) positioned on the wall, the emblem having an appearance to advertise medical services to be provided at the office;

a camera (22) unobtrusively within the emblem to monitor activities at the office and to create images;

operative components (24) located within the emblem, the operative components including a battery (26) within a battery compartment (28) with a door (30) in the emblem to provide access for replacing the battery;

the operative components also including a switch (32) adjacent to the camera to activate and inactivate the camera; and the operative components also including a digital device (34) to provide a record of the activities created by the camera which can be uploaded to a cloud storage (36), a computer system with a monitor (37) for viewing images created by the camera in both real time and subsequently, the digital device including a transceiver (38) for controlling the system from a distance using a remote control (40), the digital device comprising a microphone/speaker (42) and a button (44) adapted to be depressed for recording a message and for playback of the message.

\* \* \* \* \*